E. SWARTZWELDER.
Mechanical Movements.

No. 152,190. Patented June 16, 1874.

WITNESSES:
E. Wolff.
C. Sedgwick

INVENTOR:
E. Swartzwelder
BY
Munn
ATTORNEYS.

AM. PHOTO-LITHOGRAPHIC Co. N.Y. (OSBORNE'S PROCESS.)

UNITED STATES PATENT OFFICE.

EMANUEL SWARTZWELDER, OF CHANEYVILLE, PENNSYLVANIA.

IMPROVEMENT IN MECHANICAL MOVEMENTS.

Specification forming part of Letters Patent No. 152,190, dated June 16, 1874; application filed May 9, 1874.

*To all whom it may concern:*

Figure 1:
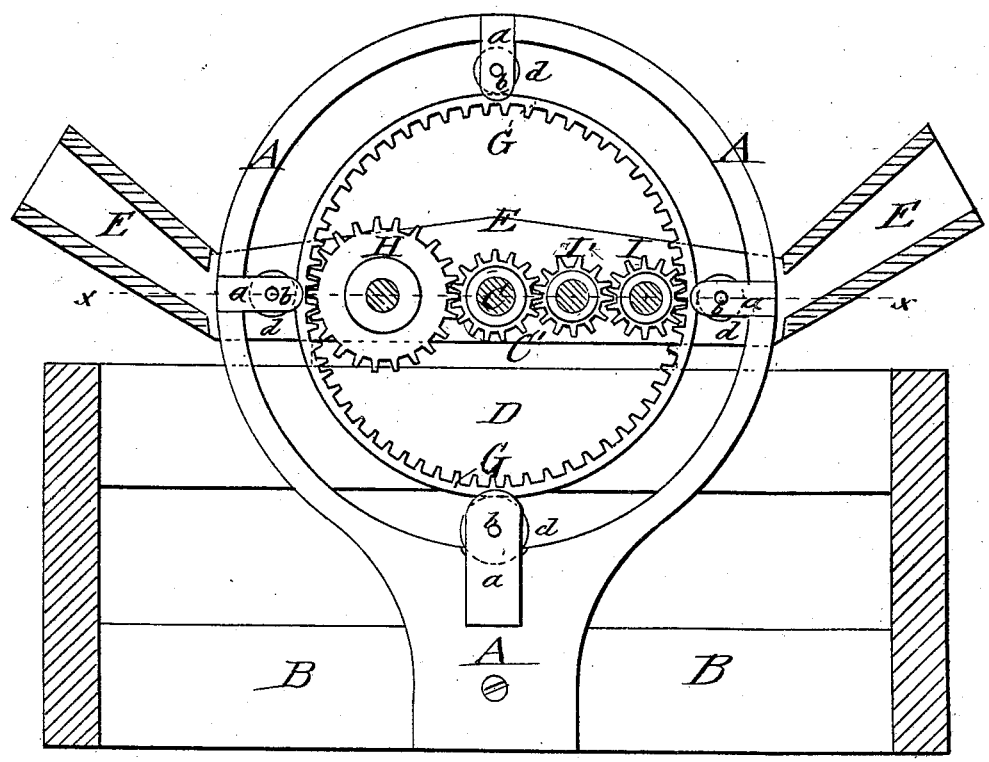
Figure 2:
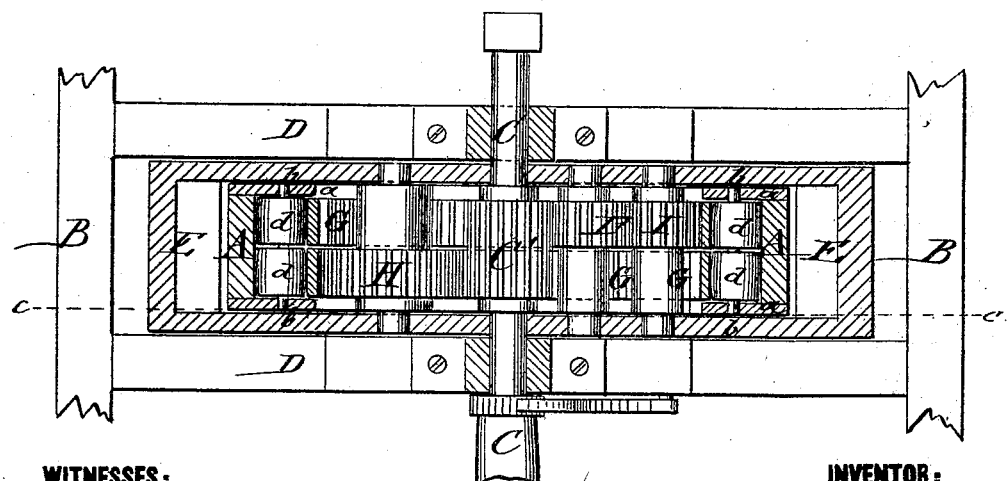

Be it known that I, EMANUEL SWARTZWELDER, of Chaneyville, in the county of Bedford and State of Pennsylvania, have invented a new and Improved Mechanical Movement, of which the following is a specification:

In the accompanying drawing, Figure 1 represents a vertical longitudinal section of my improved mechanical movement, taken on the line $c\ c$, Fig. 2; and Fig. 2 is a horizontal section of the same on the line $x\ x$, Fig. 1.

Similar letters of reference indicate corresponding parts.

My invention relates to a mechanical movement, by which a continuous rotary motion of the shaft is produced from the rocking motion of a lever pivoted loosely to the shaft.

The invention consists of a rocking-lever frame, which intermeshes, by intermediate gear-wheels and alternately-acting toothed friction-rings, with a central double cog-wheel, keyed to the shaft, so that by the strokes of the levers the continuous rotation of the shaft is produced.

In the drawing, A represents a ring-shaped standard, supported in a suitable base-frame, B, which carries on bearings of lateral side pieces D the shaft C. The lever-frame E is perforated and placed loosely on shaft D, so as to swing readily thereon, extending at both sides of ring-shaped standard. Frame E is operated by suitable handles E, socketed thereto near the outer circumference of standard A. The ring-shaped standard A guides and supports, by means of radial inward-extending side lugs $a$, having lateral shafts $b$, with two small friction-rollers, $d$, the two circular rings G, with intermeshing teeth at the inner circumference. One of the rings G gears with a larger cog-wheel, H, pivoted to the lever-frame E, which meshes again with a cog-wheel, C', of shaft C. The teeth of the second ring G also drive the shaft by a smaller cog-wheel, I, and an intermediate wheel, I', at the opposite side of the lever-frame, so that the alternating action of the gear-wheels H and I I', as produced by the lever-frame, and the motion of the toothed friction-rings in opposite directions, secure the regular gearing of the shaft-wheel, and the continuous rotary motion of the shaft in one direction.

The toothed rings serve for the purpose of keeping up the steady working and regular transmission of the lever motion to the shaft; the whole mechanism being constructed in very compact manner, taking up little space, and being, therefore, of advantage in a great number of cases in which economy of space is required, together with the change of reciprocating circular to rotary motion.

Having thus described my invention, I claim as new and desire to secure by Letters Patent—

The mechanical movement herein described, for producing continuous rotary motion from reciprocating circular or rocking motion, consisting of lever-frame E, with cog-wheels H and I I', meshing at diametrically-opposite sides alternately with the central shaft-wheel C', and the toothed friction-rings G, supported in ring-shaped standard A, for producing the rotary motion of shaft C, substantially in the manner and for the purpose set forth.

EMANUEL SWARTZWELDER.

Witnesses:
J. W. LINGENFELTER,
A. J. SAMSON.